United States Patent
Uefune et al.

(10) Patent No.: US 8,094,408 B2
(45) Date of Patent: Jan. 10, 2012

(54) MAGNETIC DISK DRIVE SEALED WITH LOW VAPOR PRESSURE FLUORINE OIL

(75) Inventors: Kouki Uefune, Kanagawa (JP); Takako Hayakawa, Kanagawa (JP); Akihiko Aoyagi, Kanagawa (JP); Takashi Kouno, Ibaraki (JP); Hitoshi Shindo, San Jose, CA (US); Kazuhide Ichikawa, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1013 days.

(21) Appl. No.: 11/903,004

(22) Filed: Sep. 19, 2007

(65) Prior Publication Data

US 2008/0068745 A1   Mar. 20, 2008

(30) Foreign Application Priority Data

Sep. 20, 2006  (JP) .................. 2006-254884

(51) Int. Cl.
*G11B 33/14* (2006.01)
*G11B 25/04* (2006.01)

(52) U.S. Cl. .................................................. 360/97.02
(58) Field of Classification Search ............... 360/97.01, 360/97.02, 97.03, 98.01
See application file for complete search history.

(56) References Cited

U.S. PATENT DOCUMENTS

| | | | |
|---|---|---|---|
| 6,052,255 A * | 4/2000 | Kawabe et al. | 360/97.02 |
| 6,266,207 B1 * | 7/2001 | Iwahara et al. | 360/97.02 |
| 6,318,910 B1 | 11/2001 | Higashikawa | |
| 6,556,372 B2 * | 4/2003 | Hearn et al. | 360/97.02 |
| 6,697,217 B1 * | 2/2004 | Codilian | 360/97.01 |
| 6,762,909 B2 | 7/2004 | Albrecht et al. | |
| 2003/0179489 A1 * | 9/2003 | Bernett et al. | 360/97.01 |
| 2005/0068666 A1 | 3/2005 | Albrecht et al. | |
| 2006/0074170 A1 * | 4/2006 | Kojima et al. | 524/474 |
| 2007/0047130 A1 * | 3/2007 | Shigenaga et al. | 360/74.1 |
| 2007/0183085 A1 * | 8/2007 | Hatchett et al. | 360/97.02 |
| 2008/0024909 A1 * | 1/2008 | Ang et al. | 360/98.01 |

FOREIGN PATENT DOCUMENTS

| | | |
|---|---|---|
| JP | 05-062446 | 3/1993 |
| JP | 08-161881 | 6/1996 |
| JP | 09-007904 | 1/1997 |
| JP | 2000-015427 | 1/2000 |
| JP | 2001-005012 | 1/2001 |
| JP | 2004-274825 | 9/2004 |

* cited by examiner

*Primary Examiner* — Craig A. Renner (57) ABSTRACT

A sealing type magnetic disc drive comprising a disc, a spindle motor for rotationally driving the disc, a head for recording or reproducing information on the disc, a base on which an actuator assembly is provided to move the head in the radius direction on the disc, and a cover jointed with the base, and low density gas is filled in the space where the base and the cover are joined, wherein low vapor pressure oil or a low viscosity adhesive is filled in a hole present at the joint of the base and the cover.

2 Claims, 7 Drawing Sheets

MAGNETIC DISK DRIVE SEALED WITH LOW VAPOR PRESSURE FLUORINE OIL

CROSS-REFERENCE TO RELATED APPLICATION

The instant nonprovisional patent application claims priority to Japanese Patent Application No. 2006-254884 filed Sep. 20, 2006 and which is incorporated by reference in its entirety herein for all purposes.

BACKGROUND OF THE INVENTION

Due to the requirements for high capacity, high recording density, and fast access for a magnetic disc drive (HDD) in recent years, a magnetic disc is inevitably rotated at a high speed and a head gimbal assembly (HGA) is driven at a high speed. Therefore, no small quantities of turbulences of air (wind turbulences) occur, and vibrations are generated to the disc and head gimbal assembly. The vibration due to wind turbulence greatly impedes the positioning of a head on the information on a disc recording high density. This is because the wind turbulence occurs randomly and it is difficult to make accurate estimate of the size and period, so that rapid and accurate positioning control becomes complicated and difficult. The wind turbulence vibration is also a primary factor of noise and becomes a main cause of impairing the silence of a drive.

As a problem occurring by the action of air in a disc drive accompanied by high speed rotation, there is also the increase in consumption of electric power. When a disc is rotated at a high speed, air in the vicinity of the disc is also drawn together and rotated. On the other hand, air apart from the disc stands still, so that shear force is generated between them, which applies load when disc rotation is stopped. This is designated as windage loss, and the higher the rotation speed, the greater the windage loss. To perform high speed rotation against the windage loss requires great output of the motor and high electric power is necessary.

Since the wind turbulence and the windage loss are proportional to the density of gas in a disc drive, there has been an idea of trying to reduce the wind turbulence and the windage loss by filling and sealing a magnetic disc drive with the gas lower in density than air, in place of air.

As low density gases, hydrogen and helium gases are proposed, but helium that is high in effect and stability is optimal from the practical use. With a magnetic disc drive sealing up helium gas hermetically therein, the above problems can be solved, and rapid and accurate positioning control, saving of electric power, and good silence can be realized.

However, the molecules of helium are extremely minute and the diffusion coefficient is great, so that the low sealing property in casings used in an ordinary magnetic disc drive will cause the helium to easily leak out during general use.

Figure 7:
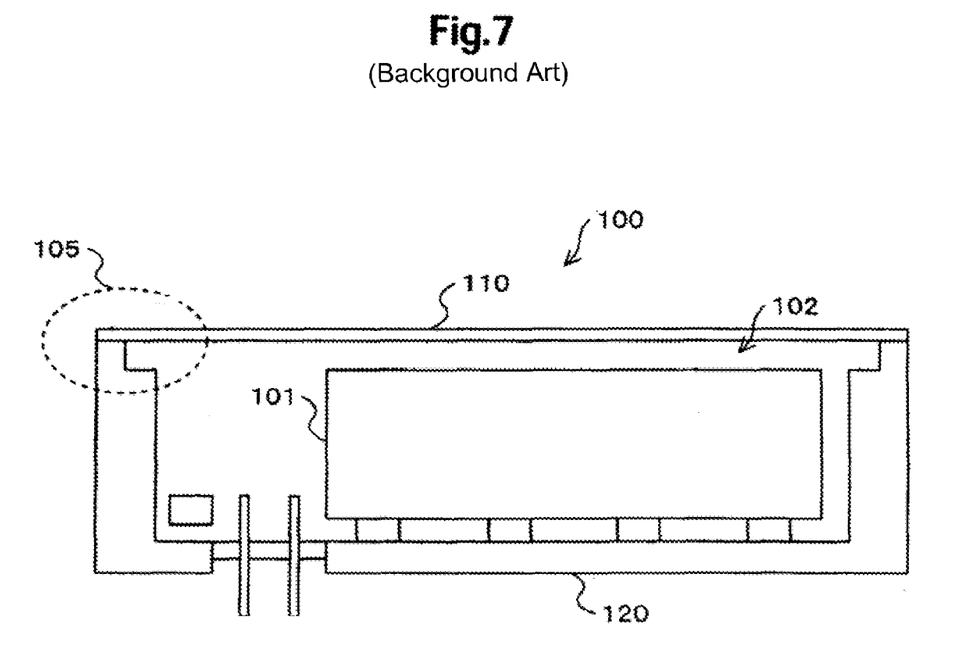
FIG. 7 is a cross sectional view of a conventional sealing type magnetic disc drive.

Accordingly, for the purpose of making low density gas such as easily leaking helium hermetically sealable, a sealing structure, e.g., the one as disclosed in U.S. Patent Publication No. 2005/0068666 ("Patent Document 1") is proposed. FIG. 7 is a cross sectional view showing the structure of the casing of the magnetic disc drive disclosed in Patent Document 1. Casing 100 has base 120 and cover 110 joined with the upper parts of the sidewalls of base 120, and head disc assembly (HDA) 101 is encased in casing interior 102. For sealing up helium in casing interior 102, attaching of cover 110 is performed in the helium gas atmosphere and a sealing type magnetic disc drive having been filled with helium in casing interior 102 is obtained at the same time with attaching.

As the place where there is a high possibility of leaking of the helium in the casing, joint 105 of the upper part of the sidewall of base 120 and cover 110 is exemplified. For completely sealing joint 105, cover 110 is welded by laser on the upper parts of the sidewalls of base 120.

From the viewpoint of durability and reliability, as the base and cover, a base molded by aluminum die casting, and an aluminum cover molded by pressing or cutting are selected.

However, when a base is molded by die casting, a mold releasing agent is coated on the mold for easy release, and gases in the atmosphere are present in the mold. In casting of a base, impurities such as the mold releasing agent and gases in the atmosphere are drawn and contained in a molded base. It is necessary to join a cover and such a base in a state of mounting the HDA. As a joining method, laser welding, soldering or brazing is proposed. By soldering or brazing, the temperature at the joint is lower than the case by laser welding, and the range of the base to be fused is far shallower as compared with laser welding, so that the interior of the base is hardly adversely influenced as compared with the case of the later described laser welding. However, the joint temperature is liable to diffuse by soldering or brazing and a wide range of the periphery becomes high in temperature, so that there is a possibility that the HDA may break from the problem of the heat resistance of HDA.

Further, in laser welding, the welding part alone becomes high temperature, and the HDA is not adversely influenced as in the case of soldering or brazing. However, in laser welding, the joint temperature is higher than in the case of soldering or brazing, and the range of the base to be fused is far deeper as compared with soldering or brazing, so that the interior of the base is adversely influenced. Specifically, as described above, impurities are contained in the base molded by die casting, and the boiling point of these impurities is lower than that of aluminum. Therefore, when the fused part of a base becomes high in temperature, the impurities suddenly expand prior to aluminum and blow off the aluminum in the periphery, as a result a defect (a blowhole) occurs. Sealed up helium is liable to easily leak through such a blowhole.

In summary, when a cover is joined with the base of a magnetic disc drive by welding, bubbles in the die casting suddenly expand due to high temperature at the time of welding and blow off fused metal, and a blowhole occurs. Low density gas sealed up in a casing is liable to easily leak through a leak path made by joining of blowholes.

BRIEF SUMMARY OF THE INVENTION

An object of embodiments in accordance with the present invention is to provide a joint structure of a base and a cover, so that helium does not easily leak through the blowholes, by filling low density gas such as helium gas in a disc drive so as to be capable of sealing for a long period of time. According to the particular embodiment of FIG. 2, after assembly, a magnetic disc drive 10 is put in basket 52 and sent in vacuum container 50 containing low vapor pressure oil 7. After that, vacuum container 50 is vacuumed, and magnetic disc drive 10 put in basket 52 is immersed in low vapor pressure oil 7, and valve 56 is opened to make vacuum container 50 atmospheric pressure condition. By the change of the condition from vacuum to atmospheric pressure, low vapor pressure oil 7 gets into leak path 6. Since helium is dissolved in low vapor pressure oil 7, diffuses in the oil, and moves in leak path 6, the passing speed conspicuously lowers.

DETAILED DESCRIPTION OF THE INVENTION

Embodiments of the present invention relate to a magnetic disc drive, in particular a sealing type magnetic disc drive suitable for sealing up low density gas such as helium gas in the interior of the drive.

An object of embodiments of the invention is to provide a joint structure of a base and a cover so that helium does not easily leak through the blowholes by filling low density gas such as helium gas in a disc drive so as to be capable of sealing for a long period of time.

According to embodiments of the invention, a sealing type magnetic disc drive that is filled with low density gas and sealed is immersed in low vapor pressure oil or a low viscosity adhesive to infiltrate the low vapor pressure oil or the low viscosity adhesive into the leak path present at the joint of the base and the cover and blowholes supposed to develop to leak path, so that the low density gas sealed up in the interior of the magnetic disc drive does not leak through the leak path.

Specifically, embodiments of the invention provide a sealing type magnetic disc drive comprising a disc, a spindle motor for rotationally driving the disc, a head for recording or reproducing information on the disc, a base on which an actuator assembly is provided to move the head in the radius direction on the disc, and a cover joined with the base, and low density gas is sealed up in the space where the base and the cover are joined, wherein low vapor pressure oil or a low viscosity adhesive is filled in a hole present at the joint of the base and the cover.

In accordance with a particular embodiment, the hole present at the joint may be a leak path made by joining of blowholes, a leak path made by joining of blowholes and cracks, or a leak path by cracks, and the low vapor pressure oil or the low viscosity adhesive is present on the outer surface side of the sidewall of the base of the leak path.

The low vapor pressure oil is preferably fluorine oil.
The low viscosity adhesive is preferably epoxy resin.
The low density gas is preferably helium.

A method for manufacturing a magnetic disc drive according to embodiments of the present invention comprises a step of assembling a base having a bottom and a sidewall with a disc, a spindle motor for rotationally driving the disc, a head for recording or reproducing information on the disc, and an actuator assembly to move the head in the radius direction on the disc, a step of joining a cover with the base while filling low density gas in the space where the base and the cover are joined, and a step of filling low vapor pressure oil or a low viscosity adhesive in a hole present at the joint of the base and the cover.

The step of filling low vapor pressure oil or a low viscosity adhesive in a hole present at the joint of the base and the cover comprises a step of carrying the magnetic disc drive containing low density gas sealed up in the space at the joint of the base and the cover to a vacuum container where the low vapor pressure oil or the low viscosity adhesive is filled, a step of immersing the magnetic disc drive in the low vapor pressure oil or the low viscosity adhesive, a step of introducing air into the vacuum container, and a step of pulling up the magnetic disc drive from the low vapor pressure oil or the low viscosity adhesive.

The step of filling the low viscosity adhesive in a hole present at the joint of the base and the cover comprises a step of immersing the magnetic disc drive containing low density gas sealed up in the space at the joint of the base and the cover in the reservoir of the low viscosity adhesive with the cover side down, so that at least the joint of the base and the cover is immersed, and a step of pulling up the magnetic disc drive from the reservoir of the low viscosity adhesive.

In this case, it is preferred to further contain a step of wiping off the low viscosity adhesive adhered on the outer surface of the magnetic disc drive.

According to embodiments of the invention, by filling low vapor pressure oil or a low viscosity adhesive in the leak path and blowhole at the weld part of the base and the cover, leakage of helium sealed up in the interior of the magnetic disc drive can be greatly reduced.

Figure 6:
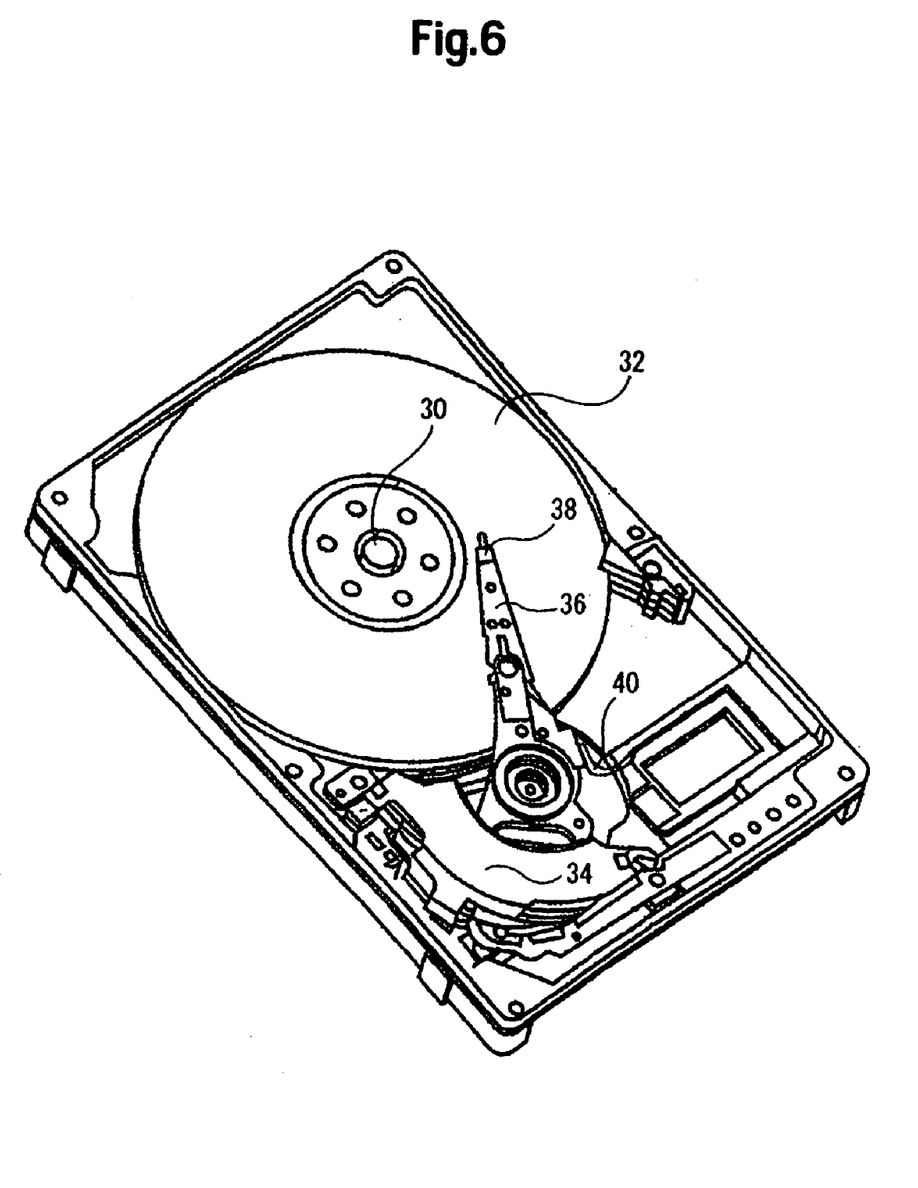
FIG. 6 is a top view of the magnetic disc drive in the state of taking off the cover to which an embodiment of the invention is applied.

In the first place, the construction as a whole of the magnetic disc drive according to an embodiment of the invention will be described by referring to FIG. 6. FIG. 6 is a diagonal view of the magnetic disc drive in the state of taking off the cover.

In FIG. 6, spindle motor 30 and magnetic disc 32 as a information recording or reproducing medium rotationally driven by spindle motor 30 are provided. Further, actuator assembly 34 containing a voice coil motor and head gimbal assembly 36 rotationally driven by actuator assembly 34 are provided. At the tip of head gimbal assembly 36 is provided magnetic head 38 for recording or reproducing with magnetic disc 32 via a slider having air bearing surface (ABS) between magnetic disc 32.

Head gimbal assembly 36 is rotationally driven in the radius direction of magnetic disc 32 and magnetic head 38 is positioned on magnetic disc 32, and recording or reproducing is performed. Further, FPC assembly 40 connects magnetic head 38 and each motor with the circuit substrate outside the casing to drive and control them, and transmits the information for magnetic head 38 to record or reproduce and the driving current for driving each motor. The magnetic disc drive works by the above described spindle motor 30, magnetic disc 32, actuator assembly 34, head gimbal assembly 36, and FPC assembly 40 (hereinafter referred to as HDA) in the casing, and the circuit substrate outside the casing.

While sealing up low density gas in the casing, a cover is welded by laser to the base on which HDA is mounted to construct the casing to obtain a sealing type magnetic disc drive. As the low density gas, hydrogen, helium and the like are preferred, and helium is especially preferably used.

Figure 4:
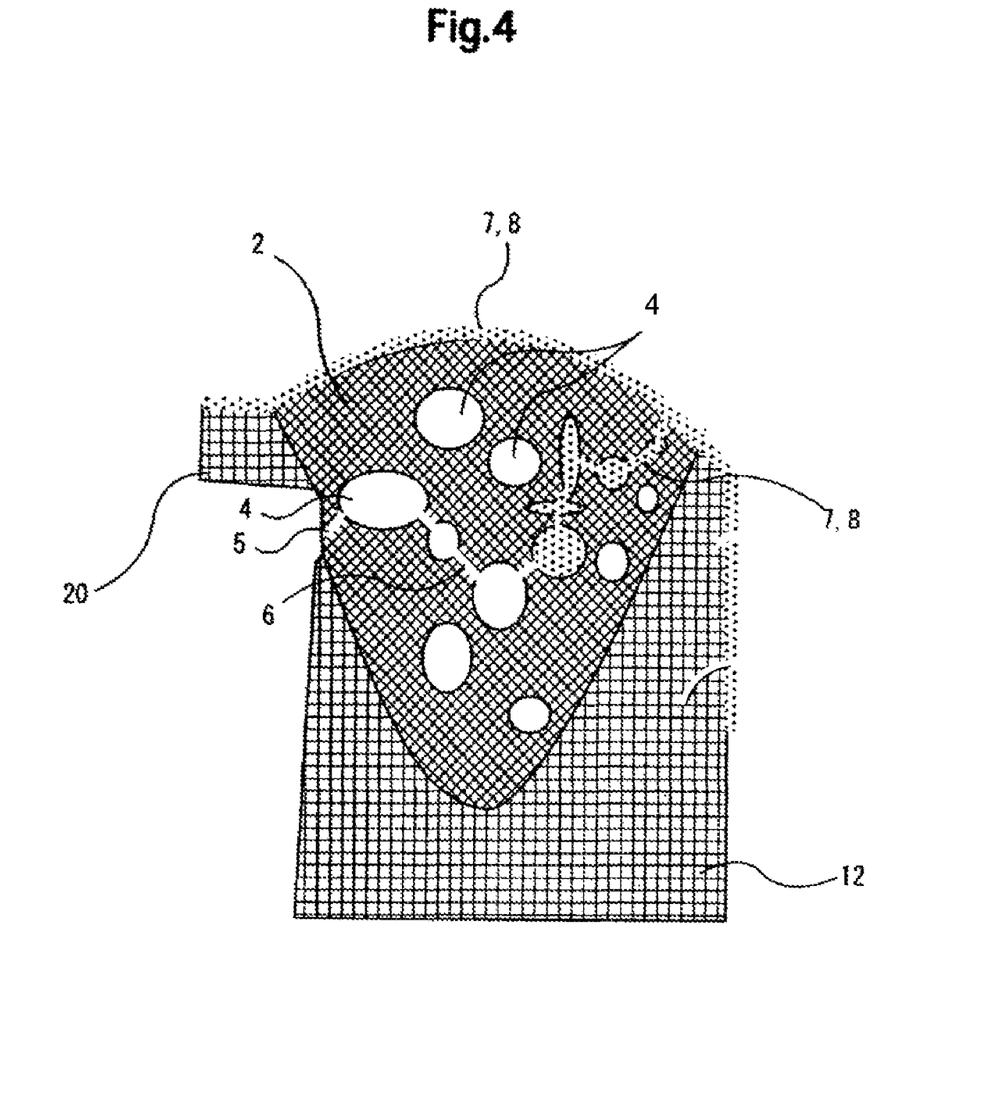
FIG. 4 is a cross sectional view showing the weld part of the base and the cover.

With referring to FIG. 4, the state of weld part 2 of base 12 welded with cover 20 is explained. As described above, defect 4 (a blowhole) is generated in the interior of die cast base 12. There is also a possibility that there is crack 5 by the stress at the time of welding. Blowholes 4 are joined with each other, or blowhole 4 and a crack 5 are joined to form leak path 6 of the sealed up helium, so that the helium easily leaks out of the casing.

According to embodiments of the invention, low vapor pressure oil or a low viscosity adhesive is infiltrated into the leak path to make helium difficult to leak out. Embodiments of the invention will be described by referring to FIGS. 1 to 5.

Figure 1:
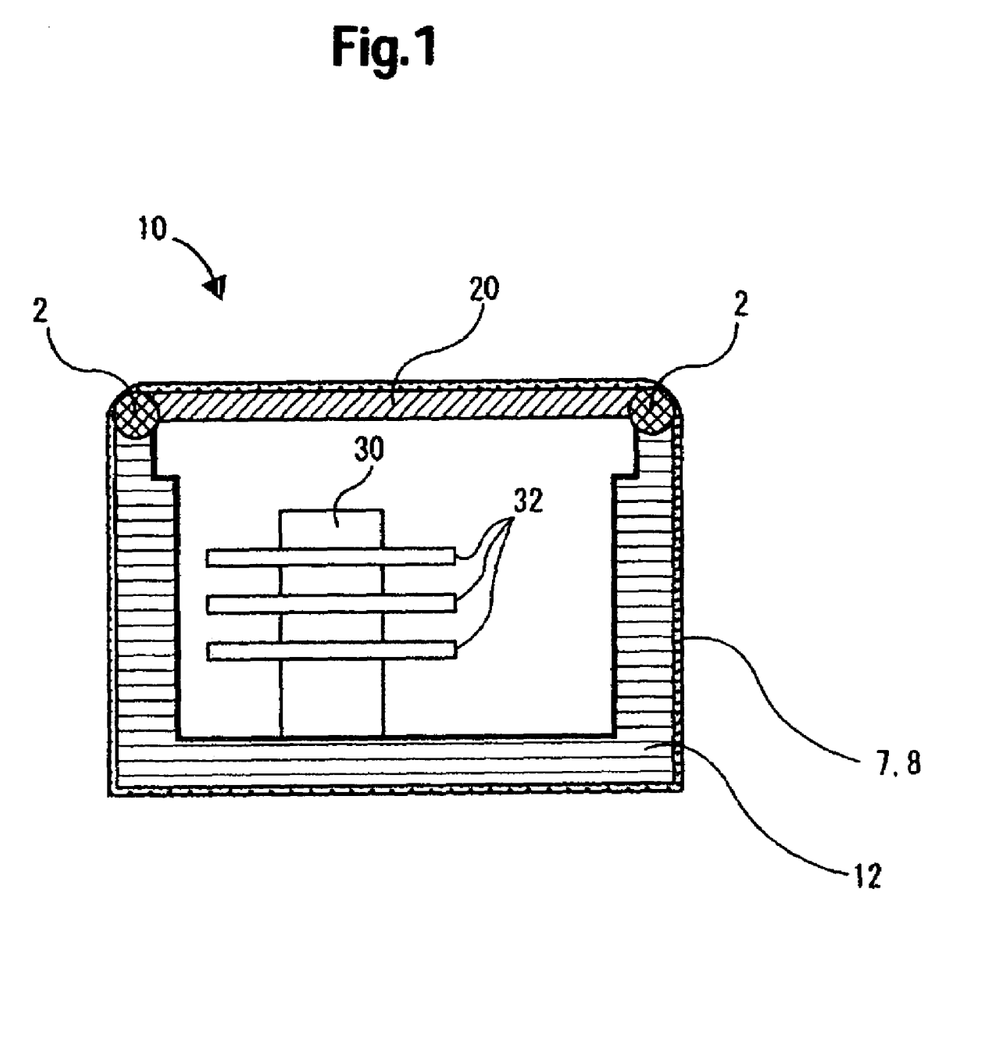
FIG. 1 is a typical cross sectional view of the magnetic disc drive according to an embodiment of the invention.

FIG. 1 is a typical cross sectional view of the magnetic disc drive according to an embodiment of the invention. The figure shows the state that the outer periphery of base 12 and cover 20 is covered with low vapor pressure oil 7 or low viscosity adhesive 8 after assembling complete sealing type magnetic disc drive 10. Low vapor pressure oil 7 or low viscosity adhesive 8 is infiltrated into leak path 6 occurring at weld part 2 as described in FIG. 4.

Figure 2A:
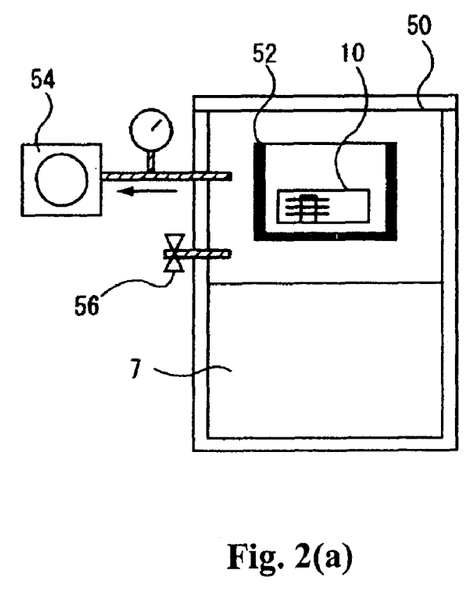
FIGS. 2(a) and 2(b) are drawings showing a method for infiltrating low vapor pressure oil into the leak path of the weld part in the magnetic disc drive according to an embodiment of the invention.
Figure 2B:
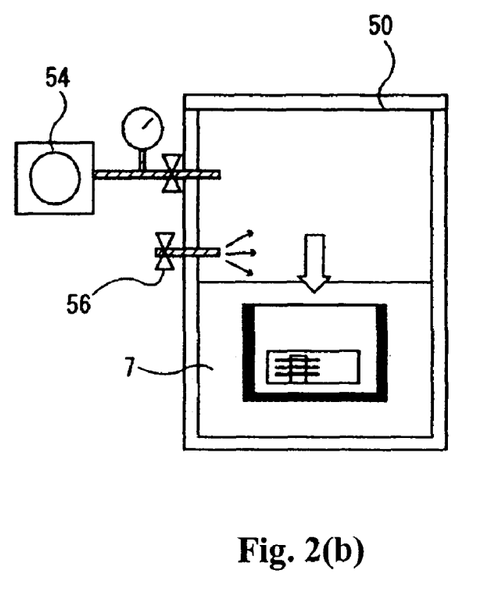

With reference to FIG. 2, a method of filtrating low vapor pressure oil 7 into leak path 6 to adhere on the outer surface of the casing is explained below. As shown in FIG. 2 (*a*), low vapor pressure oil 7 is put in advance in container 50 capable of vacuuming. Magnetic disc drive 10 after assembly is put in basket 52 and sent in vacuum container 50. After that, vacuum container 50 is vacuumed with pump 54 to make a vacuum state. Subsequently, as shown in FIG. 2 (*b*), magnetic disc drive 10 put in basket 52 is immersed in low vapor pressure oil 7 with the basket, and valve 56 is opened to introduce outside air into vacuum container 50 to make the atmospheric pressure condition. By making the condition atmospheric pressure from vacuum, as shown in FIG. 4, low vapor pressure oil 7 gets into leak path 6. However, since the interior of the casing is filled with helium, low vapor pressure oil 7 cannot get into the interior of the casing due to the difference in the inner and outer atmospheric pressure.

As low vapor pressure oil 7, fluorine oil is preferred. Fluorine oil is chemically stable, and when fluorine oil having an average molecular weight of 5,000 or more is used, the amount of evaporation is very small and surface tension is small, so that it becomes possible for fluorine oil to infiltrate into leak path 6 and prevent helium from leaking.

Figure 5:
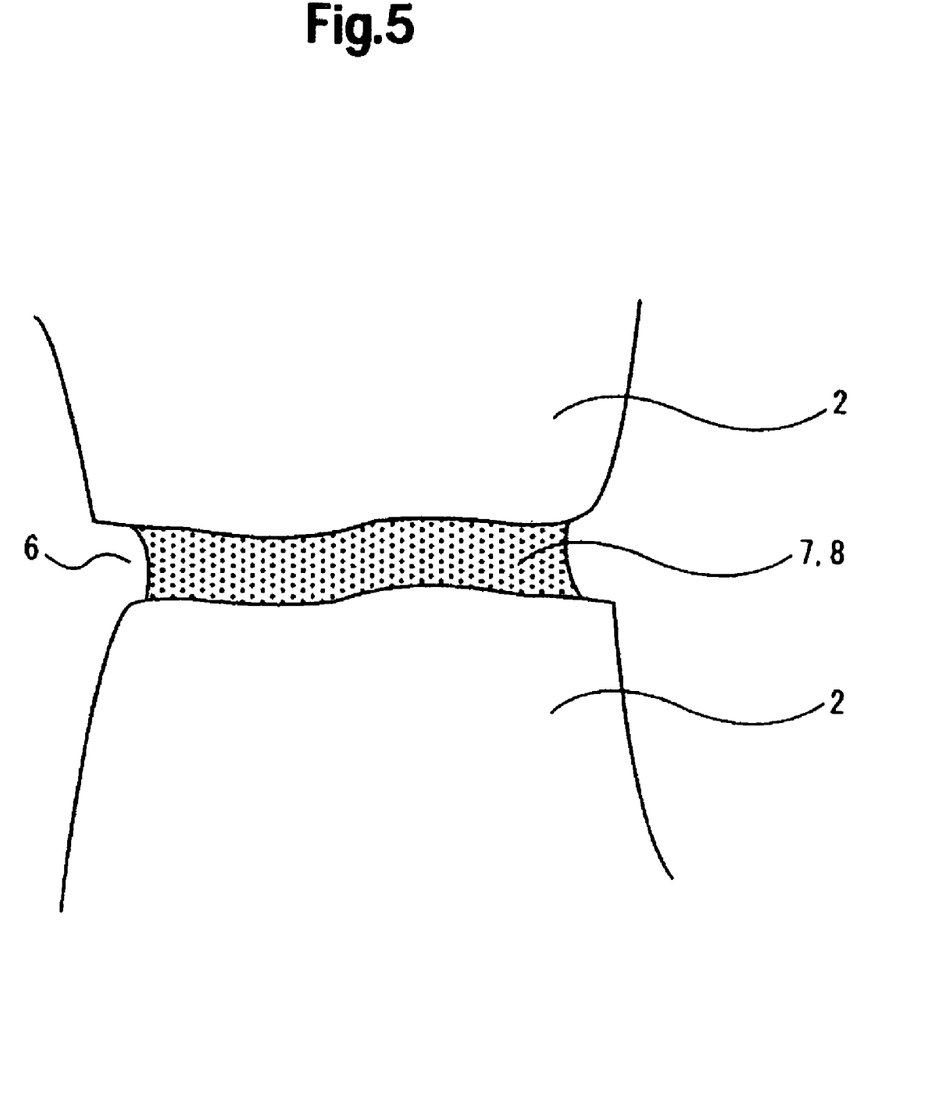
FIG. 5 is a cross sectional view of a leak path part, which shows the effect of action according to embodiments of the invention.

The reason why the leakage of helium can be prevented by the infiltration of low vapor pressure oil 7 into leak path 6 is explained. The average moving speed of helium in the space is higher than ordinary air by 2.7 times or so, and helium is inert and difficult to be adhered, so that it easily leaks out where there is a hole. On the other hand, when oil is filled in a leak path, helium is difficult to be dissolved in oil as compared with ordinary air, so that it takes long time to be dissolved. Further, as shown in FIG. 5, even when helium is dissolved in oil 7, the speed to diffuse in the oil is slow, so that the passing speed of helium through the oil is conspicuously reduced. Accordingly, the helium is not liable to leak out of the casing.

The above method is a method to infiltrate low vapor pressure oil 7 into leak path 6 to adhere on the outer surface of the casing, but it is also possible to infiltrate low viscosity adhesive 8 into leak path 6 according to this method. That is, by putting low viscosity adhesive 8 in vacuum container 50 as shown in FIG. 2 in place of low vapor pressure oil 7 and performing the same process, low viscosity adhesive 8 can be filled in leak path 6. However, the adhesive adhered on the outer surface of the casing results in closing up screw holes to attach the magnetic disc drive to other equipments, so that it is preferred to wipe off the adhesive adhered on the part of screw hole. Alternatively, it is also preferred to wipe off all the adhesive adhered on the outer surface of the casing.

Figure 3:
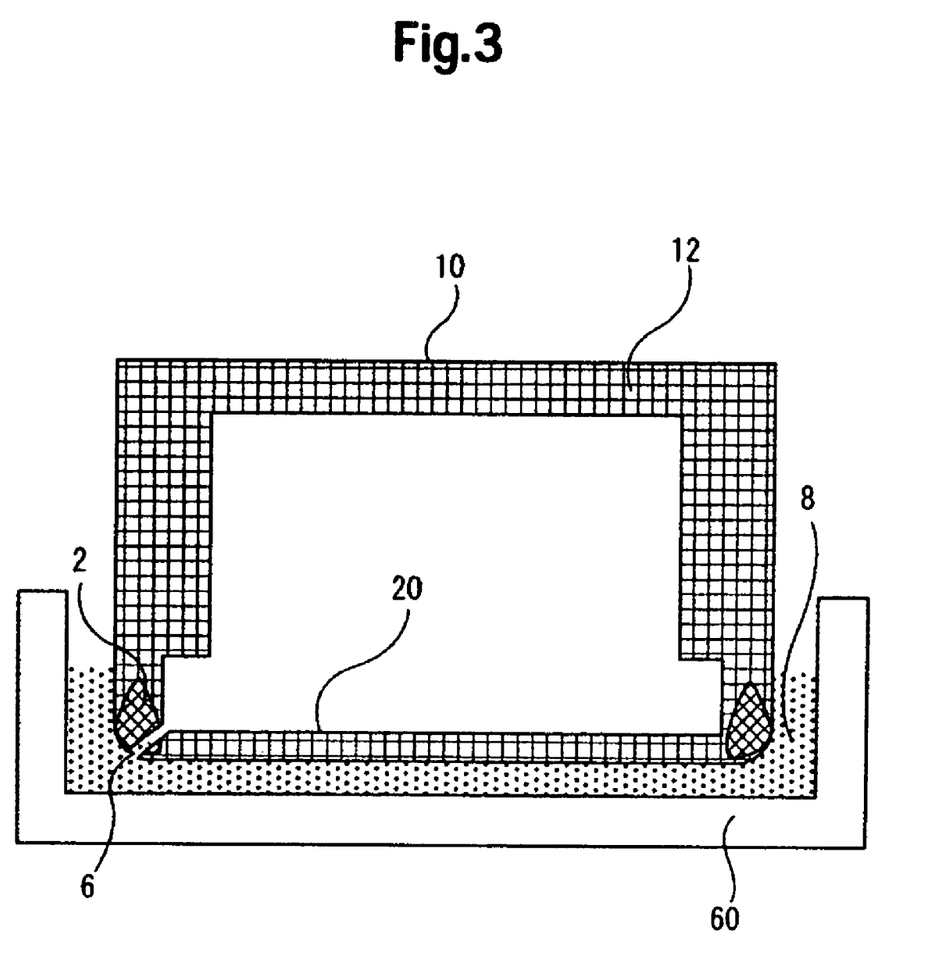
FIG. 3 is a drawing showing a method for infiltrating low viscosity adhesive into the leak path of the weld part in the magnetic disc drive according to an embodiment of the invention.

In the next place, a method especially suitable for filling low viscosity adhesive 8 in leak path 6 present at joint part 2 of base 12 and cover 20 of magnetic disc drive 10 is described by referring to FIG. 3. Low viscosity adhesive 8 such as epoxy resin is put in container 60 to prepare an adhesive reservoir. Magnetic disc drive 10 after assembly is immersed in the reservoir of the low viscosity adhesive with cover 20 side down, so that at least joint part 2 of base 12 and cover 20 is immersed in low viscosity adhesive 8. Low viscosity adhesive 8 is infiltrated into leak path 6 by capillary phenomenon. Since the interior of the casing is filled with helium, low viscosity adhesive 8 cannot get into the interior of the casing due to the difference in atmospheric pressure. Low viscosity adhesive 8 that is adhered in the vicinity of cover 20 may be wiped off or may be remained by heat curing.

Thus, in the case where low viscosity adhesive 8 is filled in leak path 6 of weld part 2 also, by the similar action as the low vapor pressure oil 7, the passing speed of helium in the part of adhesive in leak path 6 can be conspicuously reduced, so that helium is difficult to leak out of the casing. Further, in the case of the adhesive, the leaking amount of helium is determined by permeating characteristics to the adhesive, but opening area÷hole length is extremely small, so that the influence by permeation is a negligible level.

As described above, even when there is a hole (leak path) of a size of 1 μm or so at joint part 2 of cover 20 and base 12, by filling the leak path with low vapor pressure oil or a low viscosity adhesive according to embodiments of the invention, the leakage of helium can be reduced to a negligible level.

According to the embodiments of the invention, completely sealed up helium can realize rapid and accurate positioning control, saving of electric power, and good silence. Further, when electric power saving is not taken into consideration, higher disc rotation and driving of head gimbal assembly can be realized, so that the improvement of performance of disc drive can be contrived.

Further, by the completely sealed casing according to the embodiments of the invention, the influence of fluctuations in atmospheric pressure and humidity on HDA can be eliminated and oxidation deterioration of motor oil and the like in HDA can be prevented.

What is claimed is:

1. A sealing type magnetic disc drive comprising:
a disc;
a spindle motor for rotationally driving the disc;
a head for recording or reproducing information on the disc;
a base on which an actuator assembly is provided to move the head in the radius direction on the disc; and
a cover jointed with the base, and helium is filled in a space where the base and the cover are joined, wherein a low vapor pressure fluorine oil is filled in a hole present at the joint of the base and the cover, wherein the hole present at the joint is a leak path from the group of paths consisting of a leak path made by a joining of blowholes, a leak path made by a joining of blowholes and cracks, or a leak path made by cracks, wherein the low vapor pressure fluorine oil is present on an outer surface side of a sidewall of the base near the leak path.

2. A sealing type magnetic disc drive comprising:
a disc;
a spindle motor for rotationally driving the disc;
a head for recording or reproducing information on the disc;
a base on which an actuator assembly is provided to move the head in the radius direction on the disc; and
a cover jointed with the base, and hydrogen is filled in a space where the base and the cover are joined, wherein a low vapor pressure fluorine oil is filled in a hole present at the joint of the base and the cover, wherein the hole present at the joint is a leak path from the group of paths consisting of a leak path made by a joining of blowholes, a leak path made by a joining of blowholes and cracks, or a leak path made by cracks, wherein the low vapor pressure fluorine oil is present on an outer surface side of a sidewall of the base near the leak path.

* * * * *